(12) United States Patent
Oketani

(10) Patent No.: US 8,797,994 B2
(45) Date of Patent: Aug. 5, 2014

(54) FREQUENCY OFFSET ESTIMATION METHOD, COMMUNICATION APPARATUS, WIRELESS COMMUNICATION SYSTEM, AND PROGRAM

(75) Inventor: Kengo Oketani, Tokyo (JP)

(73) Assignee: NEC Corporation, Tokyo (JP)

( * ) Notice: Subject to any disclaimer, the term of this patent is extended or adjusted under 35 U.S.C. 154(b) by 180 days.

(21) Appl. No.: 13/509,710

(22) PCT Filed: Nov. 12, 2010

(86) PCT No.: PCT/JP2010/070223
§ 371 (c)(1),
(2), (4) Date: May 14, 2012

(87) PCT Pub. No.: WO2011/059068
PCT Pub. Date: May 19, 2011

(65) Prior Publication Data
US 2012/0287874 A1    Nov. 15, 2012

(30) Foreign Application Priority Data
Nov. 13, 2009  (JP) ................................ 2009-260457

(51) Int. Cl.
*H04W 4/00*     (2009.01)
(52) U.S. Cl.
USPC ........................................................ 370/330
(58) Field of Classification Search
None
See application file for complete search history.

(56) References Cited

U.S. PATENT DOCUMENTS

| | | | |
|---|---|---|---|
| 6,160,821 A * | 12/2000 | Dolle et al. | 370/509 |
| 6,618,452 B1 | 9/2003 | Huber et al. | |
| 7,995,680 B2 | 8/2011 | Wang et al. | |
| 2008/0101507 A1 | 5/2008 | Oketani et al. | |
| 2008/0232343 A1 * | 9/2008 | Nguyen et al. | 370/347 |
| 2008/0291893 A1 * | 11/2008 | Yang et al. | 370/350 |
| 2009/0052427 A1 | 2/2009 | Oketani et al. | |
| 2009/0325513 A1 | 12/2009 | Iwai et al. | |
| 2010/0027723 A1 * | 2/2010 | Kim et al. | 375/343 |
| 2010/0074128 A1 * | 3/2010 | Ishii | 370/252 |
| 2010/0098189 A1 | 4/2010 | Oketani | |
| 2010/0118990 A1 * | 5/2010 | Lee et al. | 375/260 |

(Continued)

FOREIGN PATENT DOCUMENTS

| | | |
|---|---|---|
| JP | 2002-518880 A | 6/2002 |
| JP | 2008-136172 A | 6/2008 |

(Continued)

OTHER PUBLICATIONS

Tsuyoshi Shimomura, et al., "Frequency Offset Estimation Using the Correlation Property of Zadoff-Chu Sequence", The Institute of Electronics, Nen Tsushin Society Taikai Koen Ronbunshu, B-5-18, The Institute of Electronics, Information and Communication Engineers, 2008, pp. 331.

(Continued)

*Primary Examiner* — Anh-Vu Ly
*Assistant Examiner* — Gustavo Lopez-Vargas
(74) *Attorney, Agent, or Firm* — Sughrue Mion, PLLC

(57) ABSTRACT

A frequency offset estimation unit estimates a frequency offset by combining information on a maximum window having a maximum peak power obtained from a received PRACH (Physical Random Access Channel) signal and a sign of a phase of a correlation value between channel estimation values obtained from a received PUSCH (Physical Uplink Shared Channel) signal.

10 Claims, 19 Drawing Sheets

(56) References Cited

U.S. PATENT DOCUMENTS

| | | | |
|---|---|---|---|
| 2010/0158050 A1* | 6/2010 | Yang | 370/498 |
| 2011/0103463 A1* | 5/2011 | Kim et al. | 375/240.01 |
| 2011/0293028 A1* | 12/2011 | Panicker et al. | 375/260 |
| 2012/0163478 A1* | 6/2012 | Kim et al. | 375/240.27 |
| 2013/0182746 A1* | 7/2013 | Panicker et al. | 375/144 |
| 2013/0250842 A1* | 9/2013 | Song et al. | 370/312 |

FOREIGN PATENT DOCUMENTS

| | | | |
|---|---|---|---|
| JP | 2008-236744 A | | 10/2008 |
| KR | 10-2009-0115217 A | | 11/2009 |
| WO | 2007/091590 A1 | | 8/2007 |
| WO | 2008/053971 A1 | | 5/2008 |
| WO | 2008/044629 A1 | | 4/2009 |
| WO | 2009/093628 A1 | | 7/2009 |
| WO | 2010/021014 A1 | | 2/2010 |

OTHER PUBLICATIONS

3rd Generation Partnership Project; Technical Specification Group Radio Access Network; Evolved Universal Terrestrial Radio Access (E-UTRA); Base Station (BS) radio transmission and reception (release 9); 3GPP TS 36.104; May 2009; pp. 62-63 vol. 9.0.0.

3rd Generation Partnership Project: Technical Specification Group Radio Access Network: Evolved Universal Terrestrial Radio Access (E-UTRA); Physical Channels and Modulation (Release 8); 3GPP TS 36.211; May 2009 pp. 33-43; vol. 8.7.0.

3rd Generation Partnership Project: Technical Specification Group Radio Access Network: Evolved Universal Terrestrial Radio Access (E-UTRA); and Evolved Universal Terrestrial Radio Access Network(E-UTRAN); Overall description; Stage 2; (Release 8); 3GPP TS 36.300; Jun. 2009 pp. 52-56; vol. 8.9.0.

Office Action, dated Nov. 25, 2013, issued by the Korean Intellectual Property Office, in counterpart Application No. 10-2012-7014710.

* cited by examiner

FIG. 4      REFERENCE CASE (PROTOTYPE)

FIG. 5  REFERENCE CASE (PROTOTYPE)

PRACH CORRELATION VALUE Δf=300[Hz]

PRACH CORRELATION VALUE Δf=625[Hz]

PRACH CORRELATION VALUE Δf=1100[Hz]

PRACH CORRELATION VALUE Δf=-300[Hz]

PRACH CORRELATION VALUE Δf=-625[Hz]

IN THE CASE OF RANDOM ACCESS RECEPTION

IN THE CASE OF DATA CHANNEL RECEPTION

US 8,797,994 B2

FREQUENCY OFFSET ESTIMATION METHOD, COMMUNICATION APPARATUS, WIRELESS COMMUNICATION SYSTEM, AND PROGRAM

CROSS REFERENCE TO RELATED APPLICATIONS

This application is a National Stage of International Application No. PCT/JP2010/070223 filed Nov. 12, 2010, claiming priority based on Japanese Patent Application No. 2009-260457 filed Nov. 13, 2009, the contents of all of which are incorporated herein by reference in their entirety.

TECHNICAL FIELD

Description of Related Application

The present invention is based upon and claims the benefit of the priority of Japanese Patent Application No. 2009-260457 (filed on Nov. 13, 2009), the disclosure of which is incorporated herein in its entirety by reference.

The present invention relates to a radio communication system. More specifically, the invention relates to a communication apparatus for estimating and compensating for a frequency offset, a frequency offset estimation method, a radio communication system, and a program.

BACKGROUND

In 3GPP (3rd Generation Partnership Project) LTE (Long Term Evolution), DFT (Discrete Fourier Transform)-spread-OFDM (Orthogonal Frequency Division Multiplexing) is adopted as an uplink access scheme. Generally, in the DFT-spread-OFDM, due to movement of a terminal, a frequency deviation of an oscillator, or the like, a carrier frequency difference (hereinafter referred as a "frequency offset") occurs between a receiver and a transmitter. When the frequency offset occurs, a transmission characteristic of a signal deteriorates. In order to prevent the frequency offset, estimation of a frequency offset amount and frequency offset compensation are generally performed on a receiver side.

The following describes
Initial Access Procedure in the 3GPP LTE; and
General Transmission and Reception Processing; and then
Frequency Offset Estimation and Compensation and Problem of the Frequency Offset Estimation and Compensation First, an overview of the initial access procedure will be described. In the LTE, a random access procedure is used as means for establishing synchronization of an uplink when a terminal undergoes a transition from an idle state to a connection state. FIG. 1 is a diagram illustrating the random access procedure. FIG. 1 corresponds to the figure (FIG. 10.1.5. 1-1 Contention Based Random Access Procedure) on page 53 in Non-patent Document 1.

As shown in FIG. 1, the random access procedure is constituted from the following four steps:
<Step 1>
Random Access Preamble (for Uplink) (Random Access Preamble on RACH in Uplink)
<Step 2>
Random Access Response (for Downlink) (Random Access Response Generated by MAC on DL-SCH (Down Link Shared Channel))
<Step 3>
First Scheduled Data Access (First Scheduled UL Transmission on UL-SCH (Up Link Shared Channel) (for Uplink)
<Step 4>
Data Access (for Downlink) (Contention Resolution on DL)

Details of the random access procedure and a general transmission and reception operation in a base station will be described, focusing on an uplink operation.

FIG. 2 illustrates a PRACH (Physical Random Access Channel: physical random access channel) preamble format (random access preamble format) used for initial access of a terminal in an LTE uplink. FIG. 2 corresponds to the figure on page 33 in Non-patent Document 2 (FIG. 5.7.1-1 Random access preamble format). The random access preamble is constituted from a CP (Cyclic Prefix) portion of 0.1 ms length ($=T_{CP}$) and a Preamble Sequence portion of 0.8 ms length ($T_{SEQ}$).

In the LTE, a frequency and time resource for the random access preamble in FIG. 2 is provided in advance for step 1 in FIG. 1. The terminal transmits the random access preamble in step 1, using the frequency and time resource specified for random access when the terminal undergoes a transition from the idle state to the connection state.

FIG. 4 illustrates, as a prototype example (reference case), a general configuration of a PRACH reception processing unit in a receiver on a base station side. Referring to FIG. 4, the PRACH reception processing unit includes a cyclic prefix removal unit 11, a DFT (Discrete Fourier Transform: discrete Fourier transform) unit 12, a subcarrier demapping unit 13, a preamble signal multiplication unit 14, an IDFT (Inverse Discrete Fourier Transform: inverse discrete Fourier transform) unit 15, and a maximum path detection unit 16.

In the reception processing unit in FIG. 4, cyclic prefixes are removed from a received signal received, using the frequency and time resource for the random access, by the cyclic prefix removal unit 11.

Next, the DFT unit 12 performs DFT on a signal having the cyclic prefixes removed. The subcarrier demapping unit 13 performs subcarrier demapping on a signal after the DFT (in a frequency domain) to extract a signal corresponding to a frequency resource specified for the random access.

The preamble signal multiplication unit 14 multiplies a signal subjected to subcarrier demapping by the subcarrier demapping unit 13 with a complex conjugate of a transmission preamble signal.

The IDFT unit 15 performs IDFT on the output signal of the preamble signal multiplication unit 14. The maximum path detection unit 16 calculates power per sample of the signal after the IDFT (in a time domain). The calculated power per sample is referred to as a "PRACH correlation value".

The maximum path detection unit 16 determines peak (maximum) power of the PRACH correlation value. If the peak (maximum) power is equal to or larger than a preset threshold, the base station regards that the terminal has transmitted the preamble. The base station transmits the random access response in FIG. 1 by a downlink.

When the terminal not shown receives the random access response (in step 2 in FIG. 1) from the base station, the terminal performs data transmission, using a PUSCH (Physical Uplink Shared Channel: physical uplink shared channel) in the first scheduled data access (in step 3 in FIG. 1).

FIG. 3 illustrates a PUSCH subframe (Subframe) format. Duration of one subframe is 1 ms. The one subframe includes a 14 number of DFT-Spread-OFDM symbols and a CP (Cyclic Prefix: cyclic prefix) associated with each of the 14 number of DFT-Spread-OFDM symbols.

Third and tenth symbols from a 0th symbol (symbol on the left end of the 14 symbols) are referred to as reference symbols (Reference Symbols) (indicated by RSs). A known sequence is transmitted to and from both of a receiving side and a transmitting side as the reference symbols, and is used for channel estimation and frequency offset estimation for demodulating data on the receiving side. 12 symbols of the 0th, first, second, fourth, fifth, sixth, seventh, eighth, ninth, eleventh, twelfth, and thirteenth symbols (each indicated by D) other than the reference symbols are used for data transmission. The duration of a former-half slot (Slot #0) of the subframe is set to be 0.5 ms, and the duration of a latter-half slot (Slot #1) is set to be 0.5 ms. The duration between the reference symbols (RSs) in the former-half and the latter-half slots is set to be 0.5 ms.

On receipt of an uplink signal by the base station in step 3 in FIG. 1, the base station executes downlink data transmission in response to the uplink signal, in step 4 in FIG. 1.

Next, general PUSCH reception processing in step 3 in FIG. 1 will be described. FIG. 5 illustrates, as a prototype example (reference case), a general configuration of a PUSCH reception processing unit of the receiver on the side of the base station. The reception processing unit includes a cyclic prefix removal unit 21, DFT units 22-1 and 22-2, subcarrier demapping units 23-1 and 23-2, a reference signal multiplication unit 24, a channel estimation unit 25, a frequency offset estimation unit 26, a data equalization unit 27, and a demodulation unit 28.

The cyclic prefix removal unit 21 removes cyclic prefixes from a received PUSCH signal to divide the resulting signal into a data signal and reference symbols.

The DFT units 22-1 and 22-2 perform DFT on the data signal and the reference symbols received and obtained by the division. The subcarrier demapping units 23-1 and 23-2 performs subcarrier demapping on the signal after the DFT (in the frequency domain) to extract a frequency domain signal allocated to the user.

The reference signal multiplication unit 24A multiplexes a subcarrier demapped reference symbol with a complex conjugate of a transmitted reference symbol. Then, the channel estimation unit 25 obtains a channel estimation value.

Using an obtained channel estimation value, the frequency offset estimation unit 26 estimates a frequency offset amount.

Next, the obtained channel estimation value and a data signal after the subcarrier demapping are supplied to the data equalization unit 27. The data equalization unit 27 equalizes the frequency domain of the data signal.

Finally, the demodulation unit 28 converts the signal equalized in the frequency domain by the data equalization unit 27 into a time domain signal. Further, the demodulation unit 28 performs offset compensation on the signal converted into the time domain signal, using the frequency offset amount estimated by the frequency offset estimation unit 26.

A general example of the frequency offset compensation performed on the signal converted into the time domain signal is given by the following expression (1):

$$s_{dem,comp}(k) = s_{dem}(k) \cdot \exp(-j2\pi k \cdot \Delta f \cdot \Delta T); k=0, 1, 2, \quad (1)$$

where $S_{dem}(k)$ (k=0, 1, 2, . . . ) is a complex signal (before the frequency offset compensation) converted into the time domain signal by the demodulation unit 28.

$S_{dem,comp}(k)$ (k=0, 1, 2, . . . ) is a signal (after the frequency offset compensation) obtained by the frequency offset compensation performed on the complex signal converted into the time domain signal by the demodulation unit 28.

Δf[Hz] is a frequency offset estimation value estimated by the frequency offset estimation unit 26.

ΔT[s] is the duration of one sample of the demodulated signal converted into the time domain signal by the demodulation unit 28.

The frequency offset amount during initial access is obtained by taking correlation between complex channel estimation values of two slots obtained from the reference symbols (RSs) of the former-half and latter-half slots of the PUSCH signal, and by further obtaining an argument of the complex correlation value. This process will be described below in detail.

First, it is assumed that a complex channel estimation value as follows is obtained for each subcarrier allocated to the user:

$$H(s,k) \quad (2)$$

where s is a slot number in one subframe, and s=0, 1 (0: former-half slot, 1: latter-half slot) (refer to FIG. 3).

k is a sub carrier number, and k=0, 1, . . . , N−1 (where N indicates the number of subcarriers allocated to the user).

The frequency offset amount Δf[Hz] is estimated as shown in the following Expressions (3) and (4), using the channel estimation values of two slots.

A correlation value R between the channel estimation values (H(s=0, k) and H(s=1, k)) of the two slots obtained from the received PUSH signal is calculated according to the following Expression (3):

$$R = \sum_{k=0}^{N-1} H(s=0,k)^* \bullet H(s=1,k) \quad (3)$$

where * indicates a complex conjugate.

$$\sum_{k=0}^{N-1}$$

indicates a total sum of H (s=0, k)*H(s=1, k) when k ranges from 0 to N−1 (N being the number of subcarriers allocated to the user).

The frequency offset estimation value Δf [Hz] is calculated from the correlation value R given by the Expression (3), using the following Expression (4):

$$\Delta f[\text{Hz}] = \frac{\arg R \lfloor \text{radian} \rfloor}{2\pi} \times \frac{1}{T_S \lfloor s \rfloor} \quad (-\pi \le \arg R < \pi) \quad (4)$$

where $T_s$[s] indicates the duration [unit: s (second)] between the two reference symbols (RSs) in the former-half and latter-half slots of the PUSCH signal, and argR indicates an argument [unit: radian (radian)] of the complex correlation value R between the channel estimation values, and ranges from −π to +π.

Estimation of the frequency offset amount Δf, using the Expression (4) utilizes the fact that the argument argR of the complex correlation value R between the channel estimation values obtained from the PUSCH signal is given by:

$$2\pi \cdot \Delta f \cdot T_s[\text{radian}] \quad (5)$$

In the LTE, it is defined that $T_s$=0.5 [ms] (=0.5×10$^{-3}$) (refer to FIG. 3). Thus, the above Expression (4) becomes as shown in the following Expression (6):

$$\Delta f[\text{Hz}] = \frac{\arg R[\text{radian}]}{2\pi} \times \frac{1}{0.5 \times 10^{-3}} \quad (6)$$

$$= 1000 \times \frac{\arg R[\text{radian}]}{\pi} (-\pi \le \arg R < \pi)$$

In case the abovementioned estimation method is used, an estimable frequency offset range [Hz] is uniquely determined by the following expression (7), based on the duration Ts [second] between the reference symbols (RSs) of the two slots (former-half and latter-half slots) to be correlated. The relational expression (7) is derived from the expression (4) of $\Delta f=(\arg R)/(2\pi T_s)$, where argR is in a relationship of $-\pi \leq \arg R <$.

$$-\frac{1}{2} \cdot \frac{1}{T_S} \leq \quad (7)$$

$$\text{ESTIMABLE FREQUENCY OFFSET RANGE [Hz]} < \frac{1}{2} \cdot \frac{1}{T_S}$$

In the PUSCH subframe format specifications of the LTE (where $T_s=0.5$ [ms] $(=0.5\times10^{-3})$), the estimable frequency offset range becomes from $-1000$ Hz to $1000$ Hz based on the expression (7).

Patent Document 1 describes configurations of a control signal and a data signal (including a preamble transferred on a PRACH and a reference signal included in a frame on a PUSCH) on an air interface between a base station apparatus and a terminal apparatus, the terminal apparatus, and the base station apparatus in an LTE communication system. Patent Document 2 discloses an apparatus for quickly and correctly detecting a preamble code and a method (of estimating an integer carrier frequency offset of a target base station by detecting a preamble index of the target base station to select a target cell) in an environment where there is a carrier frequency offset. Patent Document 3 discloses a configuration or the like for determining a first frequency offset of a received signal sequence, using first and second preambles.

[Patent Document 1]
JP Patent Kokai Publication No. JP2008-136172A
[Patent Document 2]
JP Patent Kokai Publication No. JP2008-236744A
[Patent Document 3]
JP Patent Kohyou Publication No. JP2002-518880A
[Non-patent Document 1]
3GPP TS 36.300 V8.9.0 (2009-06) 101.5 Random Access Procedure
[Non-patent Document 2]
3GPP TS 36.211 V8.7.0 (2009-05) 5.7 Physical Random Access Channel
[Non-patent Document 3]
3GPP TS36.104 V9.0.0 (2009-06) B.3 High Speed Train Condition

SUMMARY

An analysis by the present invention will be given below. According to Non-patent Document 3, it is necessary to compensate for a frequency offset in the range of $-1340$ to $+1340$ Hz at a base station in the LTE.

On contrast therewith, the frequency offset estimable range in the above-mentioned estimation of the frequency offset during the initial access is from $-1000$ Hz to $1000$ Hz. That is, there is a problem that the frequency offset in the range of $-1000$ to $-1340$ Hz and the frequency offset in the range of $1000$ to $1340$ Hz specified in Non-patent Document 3 cannot be correctly estimated.

When the frequency offset is $+1100$ Hz, for example, the phase argR ($-\pi \leq \arg R < \pi$) of the correlation value R between the two reference symbols assumes $1.1\pi$ ($\to -0.9\pi$) [radian], as given by the following expression (8).

The frequency offset $\Delta f$ is estimated to be $-900$ Hz as shown by the following expression (9), using the expression (6).

$$\text{PHASE OF CORRELATION VALUE[radian]} = 2\pi \times \Delta f \times T_s = 1100 \times 0.5 \cdot 10^{-3} = 1.1\pi \equiv 0.97\pi \quad (8)$$

$$\Delta f[\text{Hz}] = \frac{-0.9\pi[\text{radian}]}{2\pi} \times \frac{1}{T_S[s](=0.5\times10^{-3})} \quad (9)$$
$$(-\pi \leq \arg R < \pi)$$
$$= -900[\text{Hz}]$$

That is, the frequency offset cannot be correctly estimated. When the frequency offset is in the range of $-1000$ to $-1340$ Hz, there is the same problem.

Accordingly, an object of the present invention is to provide a method, an apparatus, a system, and a program whereby an estimable frequency offset range can be expanded and a frequency offset can be correctly estimated.

According to a first aspect of the present invention, there is provided a communication apparatus comprising a frequency offset estimation unit that estimates a frequency offset by combining:

information on a maximum window having a maximum peak power, obtained from a received PRACH (Physical Random Access Channel: physical random access channel) signal; and a sign of a phase of a correlation value between channel estimation values obtained from a received PUSCH (Physical Uplink Shared Channel: physical uplink shared channel) signal.

According to a second aspect of the present invention, there is provided a frequency offset estimation method comprising estimating a frequency offset by combining:

information on a maximum window having a maximum peak power, obtained from a received PRACH (Physical Random Access Channel: physical random access channel) signal; and a sign of a phase of a correlation value between channel estimation values obtained from a received PUSCH (Physical Uplink Shared Channel: physical uplink shared channel) signal.

According to a third aspect of the present invention, there is provided a frequency offset estimation program for causing a computer (processor) to execute the processing comprising:

estimating a frequency offset by combining:

information on a maximum window having a maximum peak power, obtained from a received PRACH (Physical Random Access Channel: physical random access channel) signal; and a sign of a phase of a correlation value between channel estimation values obtained from a received PUSCH (Physical Uplink Shared Channel: physical uplink shared channel) signal. There is also provided a storage medium (a memory device, a magnetic/optical disk medium/device) having the frequency offset estimation program according to the present invention stored therein.

According to the present invention, an estimable frequency offset range can be expanded, and a frequency offset can be correctly estimated.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Figure 1:
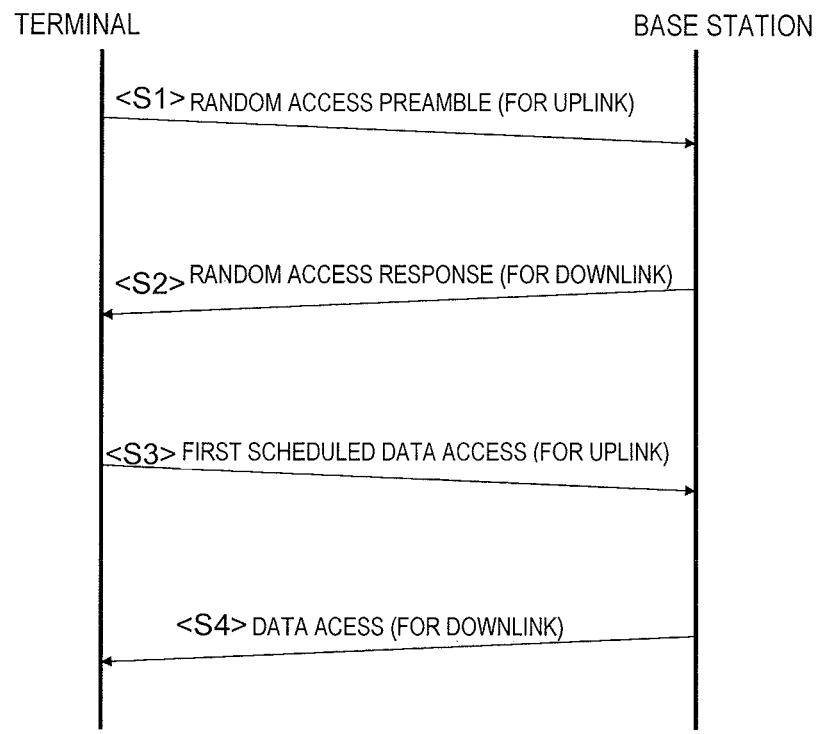
FIG. 1 is a diagram illustrating a random access procedure.
Figure 2:
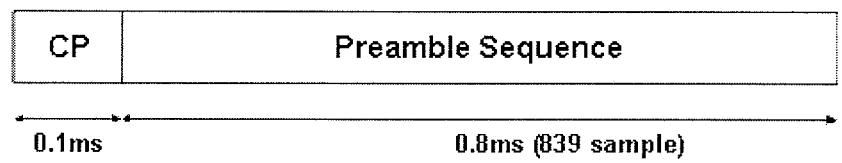
FIG. 2 is a diagram illustrating a PRACH preamble format.

Preferred modes of the present invention will be described.
One of the preferred modes of the present invention is given by the above described first aspect.
According to a second mode of the present invention, the frequency offset estimation unit estimates the frequency offset from the phase of the correlation value between the channel estimation values, based on:
a correspondence relationship between each frequency segment of a first frequency segment group obtained by dividing an estimable frequency offset range and the maximum window; and
a relationship between each frequency segment of a second frequency segment group obtained by dividing the estimable frequency offset range and the sign of the correlation value between the channel estimation values.

According to a third mode of the present invention, the communication apparatus comprises:
a PRACH reception processing unit; and
a PUSCH reception processing unit. The PRACH reception processing unit comprises at least:
a plurality of maximum path detectors that respectively detect maximum path powers from the received PRACH signal, using a plurality of mutually different windows; and
a maximum path window selection unit that selects one of the windows corresponding to the maximum power from among the maximum path powers respectively detected by the maximum path detectors. The PUSCH reception processing unit comprises at least:
a channel estimation unit that performs channel estimation from a received reference signal;
the frequency offset estimation unit; and
a demodulation unit that performs frequency offset compensation using a frequency offset amount estimated by the frequency offset estimation unit. The frequency offset estimation unit estimates the frequency offset, using information on the phase of the correlation value between the channel estimation values and the sign of the phase from the channel estimation unit and the information on the maximum window from the maximum path window selection unit.

According to a fourth mode of the present invention, the windows comprise a center window, a left window, and a right window. Assuming that argR [radian] is an argument of a complex correlation value R between the channel estimation values obtained from the received PUSCH signal and $T_s[s]$ is a duration between reference symbols in a former-half slot and a latter-half slot of a PUSCH subframe, the frequency offset estimation unit determines a frequency offset Δf according to the following expression,
in case argR is greater than or equal to 0 and less than π, and the maximum window is the center window or the right window:

$$\Delta f = \frac{\text{arg}R[\text{radian}]}{2\pi} \times \frac{1}{T_S[s]}$$

in case argR is greater than or equal to 0 and less than π, and the maximum window is the left window:

$$\Delta f = \left(\frac{\text{arg}R[\text{radian}]}{2\pi} - 1\right) \times \frac{1}{T_S[s]}$$

in case argR is greater than or equal to −π and less than 0, and the maximum window is the center window or the left window:

$$\Delta f = \frac{\text{arg}R[\text{radian}]}{2\pi} \times \frac{1}{T_S[s]}$$

and
in case argR is greater than or equal to −π and less than 0, and the maximum window is the right window:

$$\Delta f = \left(\frac{\text{arg}R[\text{radian}]}{2\pi} + 1\right) \times \frac{1}{T_S[s]}$$

the estimable frequency offset range being set to a range between $-1/T_s$ [Hz] and less than $+1/T_s$ [Hz].

According to a fifth mode of the present invention, in case a path search width is indicated by $N_{search}$, a preamble sequence length is indicated by $N_{zc}$, and a distance between peaks of the center window and each of the left and right windows is indicated by d, first to third maximum path detectors respectively corresponding to the center window, the left window, and the right window respectively determine maximum values of squares of powers p (k), using
a center window $W_{center}=\{0, 1, \ldots, N_{search}-1\}$,
a right window $W_{right}=\{d^{-1}, (d^{-1}+1) \bmod N_{ZC}, \ldots, (d^{-1}+N_{search}-1) \bmod N_{ZC}\}$, and
a left window $W_{left}=\{N_{ZC}-d^{-1}, (N_{ZC}-d^{-1}+1) \bmod N_{ZC}, \ldots, (N_{ZC}-d^{-1}+N_{search}-1) \bmod N_{ZC}\}$ respectively.

According to a sixth mode of the present invention, in the selection of the maximum window, the maximum window is selected from among the maximum path powers of the windows, based on the power adjusted by a predetermined scaling value.

In a method according to the present invention, frequency offset estimation is performed by combining:

a peak power of a correlation value obtained from a received PRACH signal in step 1 of FIG. 1; and a correlation value between channel estimation values obtained from a received PUSCH (Physical Uplink Shared Channel: physical uplink shared channel) signal in step 3 of FIG. 1. In the related art, frequency offset estimation is performed using only the PUSCH received signal in step 3 of FIG. 1.

As will be described below, according to the present invention, an estimable range of the frequency offset Δf can be expanded from the range of −1000 Hz to 1000 Hz of the related art to the range of −2000 Hz to 2000 Hz.

FIGS. 6, 7, 8, 9, 10, 11, and 12 respectively show received PRACH signal correlation values (PRACH correlation values) when the frequency offset amount Δf=0 [Hz], Δf=300 [Hz], Δf=625 [Hz], Δf=1100 [Hz], Δf=−300 [Hz], Δf=−625 [Hz], and Δf=−1100 [Hz]. Herein one wireless transmission path is assumed. Referring to FIGS. 6 to 12, a horizontal axis indicates k (k=0 to $N_{zc}-1$; $N_{zc}$ indicates a PRACH preamble sequence length that will be described later), and a vertical axis indicates power $|p(k)|^2$ [dB].

Figure 6:
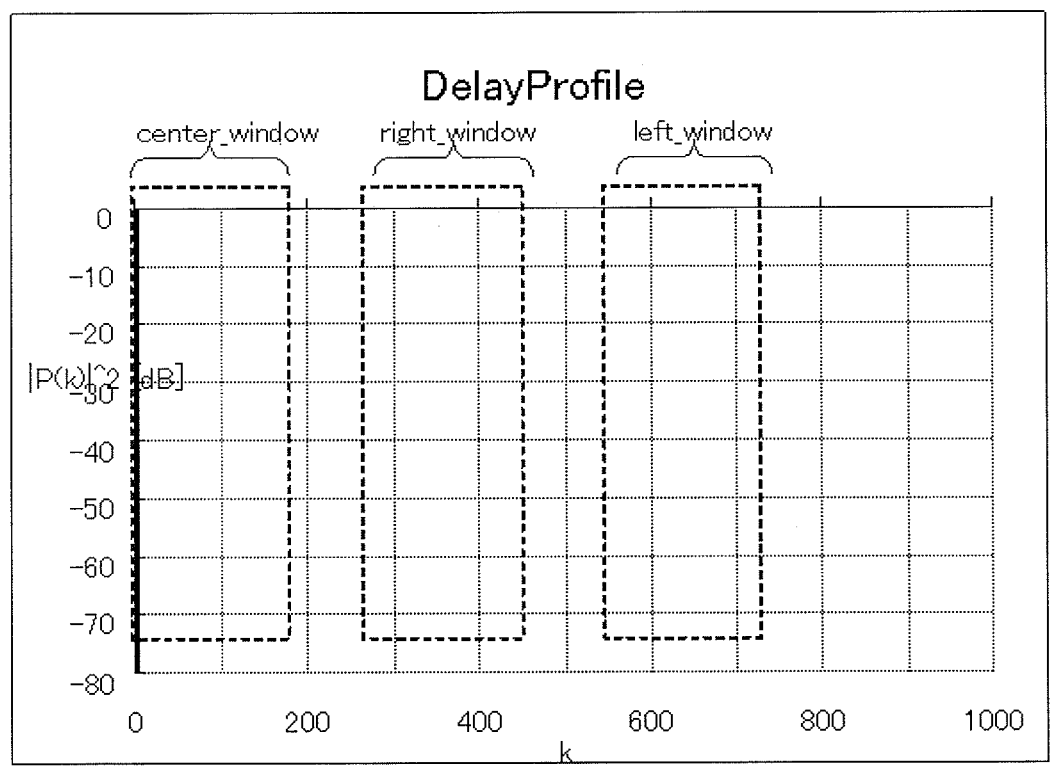
FIG. 6 is a graph illustrating a PRACH correlation value in case of Δf=0 [Hz]

In case there is no frequency offset (Δf=0 [Hz]), a sharp peak occurs at k=0, in a center window (center_window), and no sharp peak is present in each of left and right windows (righ_window, left_window) with respect to the center window, as shown in FIG. 6.

Figure 7:
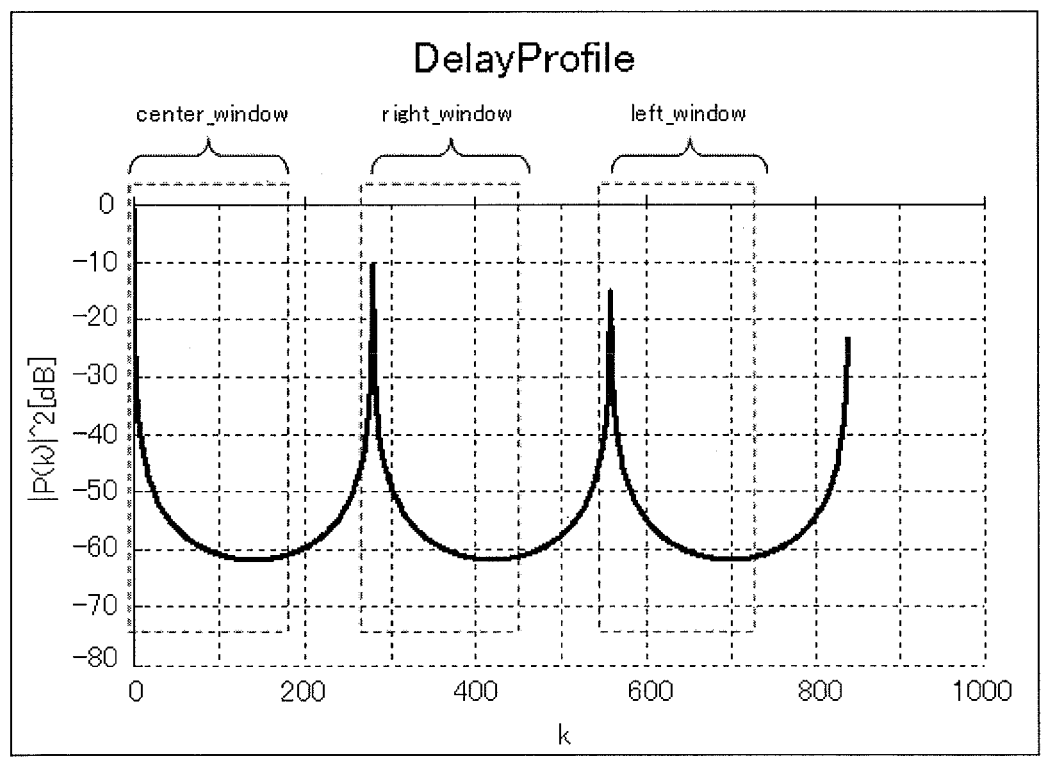
FIG. 7 is a graph illustrating a PRACH correlation value in case of Δf=300 [Hz]
Figure 8:
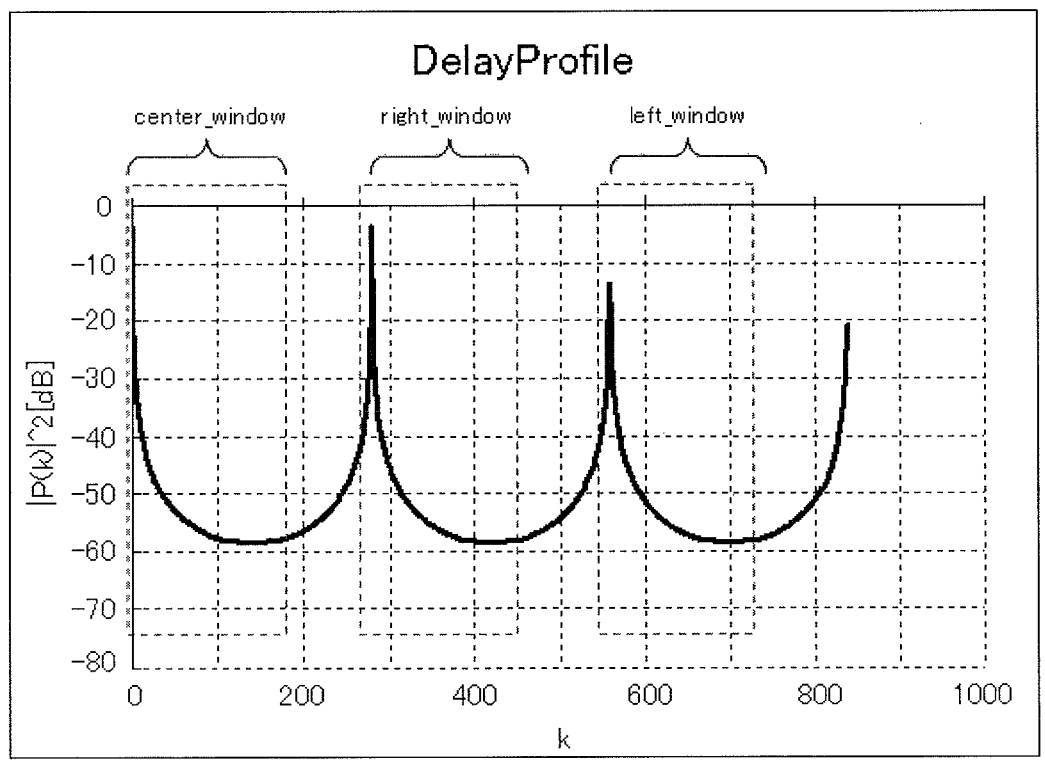
FIG. 8 is a graph illustrating a PRACH correlation value in case of Δf=625 [Hz]
Figure 9:
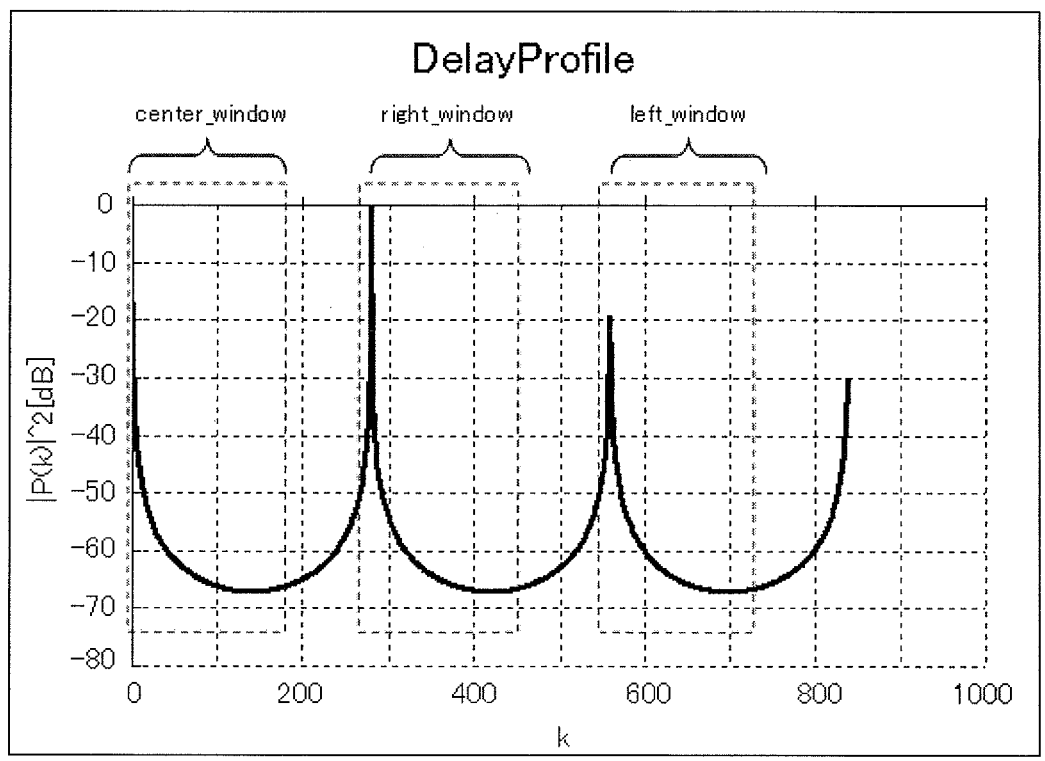
FIG. 9 is a graph illustrating a PRACH correlation value in case of Δf=1100 [Hz]
Figure 10:
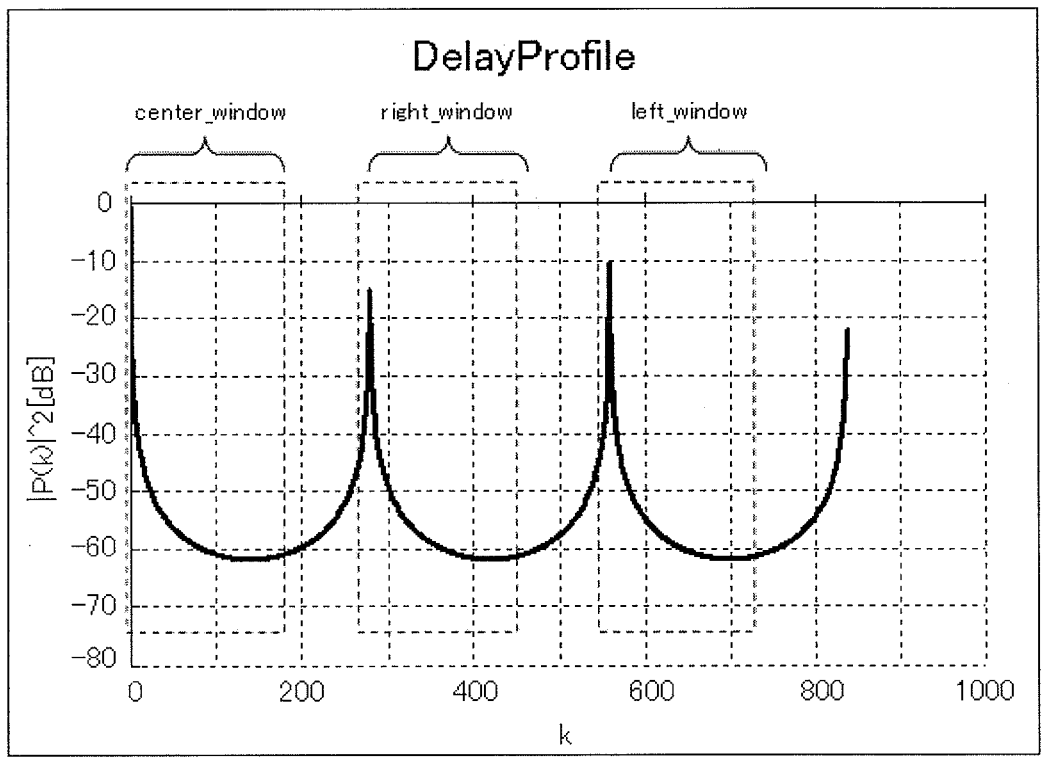
FIG. 10 is a graph illustrating a PRACH correlation value in case of Δf=−300 [Hz]
Figure 11:
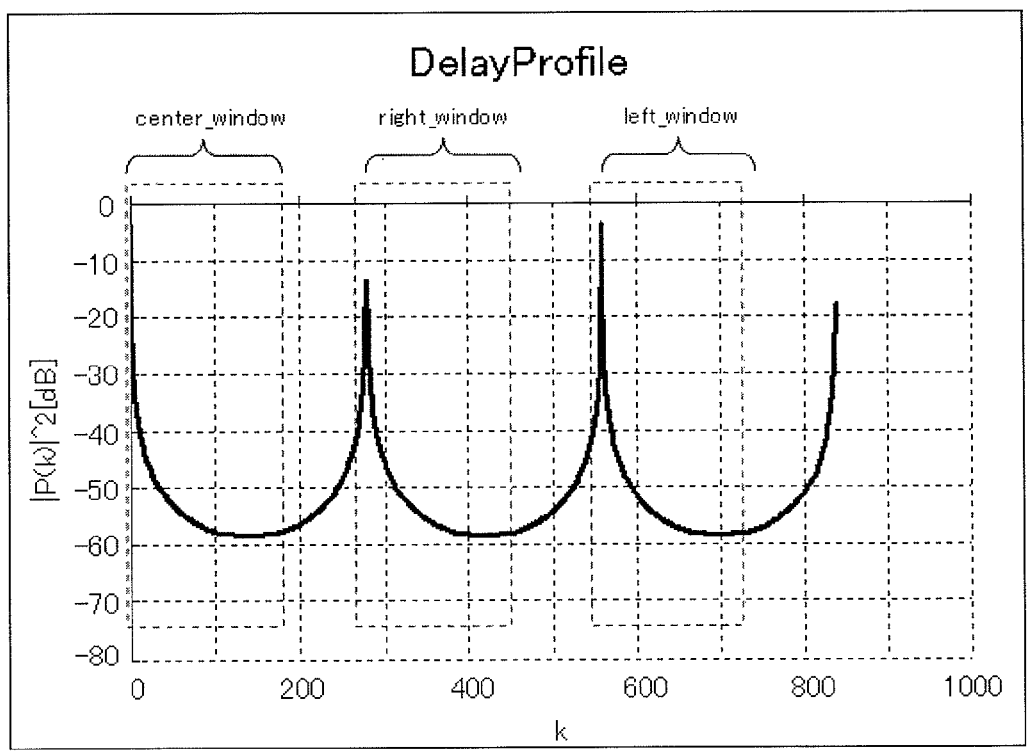
FIG. 11 is a graph illustrating a PRACH correlation value in case of Δf=−625 [Hz]
Figure 12:
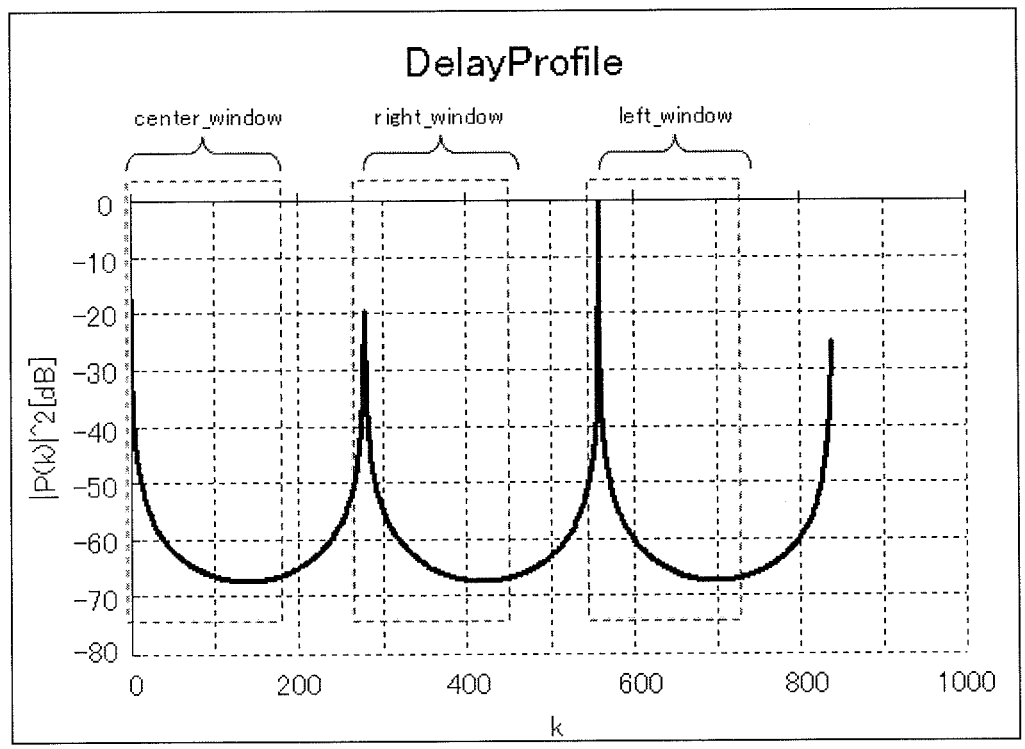
FIG. 12 is a graph illustrating a PRACH correlation value in case of Δf=−1100 [Hz]

On contrast therewith, in case there is a frequency offset, it can be seen that there is a peak in each of the left and right windows as well from FIGS. 7 and 10 (indicating the PRACH correlation values when Δf=±300 [Hz]), FIGS. 8 and 11 (indicating the PRACH correlation values when Δf=±625 [Hz]), FIGS. 9 and 12 (indicating the PRACH correlation values when Δf=±1100 [Hz]).

Herein, it should be noted that a window including k=0 is defined as the center window (center_window), a window including k=$u^{-1}$ is defined as the right window (right_window), and a window including k=$N_{zc}-u^{-1}$ is defined as the left window (left_window). This is a property specific to a Zadoff-Chu sequence, used for a PRACH preamble.

A distance (time difference) d between the peaks of the center window and each of the left and right windows is uniquely determined by the following expression (10) with respect to an arbitrary u.

$$d = u^{-1} \bmod N_{ZC} \quad (10)$$

where u is a parameter "u" (Physical Root Sequence Index) in a definition expression of $x_u(n)$ of a PRACH preamble in 5.7.2 Preamble Sequence Generation on page 39 of Non-patent Document 2.

$N_{zc}$ is a PRACH preamble sequence length (=839 or 139) specified in Table 5.7.2-1: Random access preamble sequence length on page 40 of Non-patent Document 2.

$u^{-1}$ is a multiplicative inverse of u, and is a number equal to or larger than 1 but smaller than $N_{zc}$, multiplication of which by u results in 1 ($u \cdot u^{-1} = u^{-1} \cdot u \equiv 1 \bmod N_{zc}$), under the condition of mod $N_{zc}$.

The PRACH correlation values when Δf=0 [Hz], Δf=±300 [Hz], Δf=±625 [Hz], and Δf=±1100 [Hz] in FIGS. 6 to 12 show examples when u=3 and Ncs=839. In this case, $u^{-1}$ becomes equal to 280 (3×280=840≡1 mod 839).

That is, the presence of a frequency offset (Δf≠0) in this example indicates that, in addition to the peak present at k=0 in the center window (center_window), peaks also are present at k=$u^{-1}$ (=280) in the right window (right_window) and at k=$N_{zc}-u^{-1}$ (=559) in the left window (left_window), under the influence of the frequency offset.

It can be seen from the respective PRACH correlation values, at Δf=0 [Hz], Δf=±300 [Hz], Δf=±625 [Hz], and Δf=±1100 [Hz] in FIGS. 6 to 12 that the magnitude of the peak of the correlation value obtained from the received PRACH signal in each window greatly depends on the frequency offset amount.

If there is no frequency offset, or in case of Δf=0 [Hz] in FIG. 6, for example, there is a sharp peak present only at a point of k=0. On contrast therewith, in cased of other frequency offsets, such as in cases of Δf=±300 [Hz] in FIGS. 7 and 10, power peaks smaller than the peak in the center window (center_window) are observed at k=$u^{-1}$ (k=280 in this example) in the right window (right_window) and at k=839−$u^{-1}$ (k=559 in this example) in the left window (left_window).

In case of the frequency offset Δf=625 [Hz] in FIG. 8, the peak power in the center window (center_window) matches the peak power in the right window (right_window). In case of the frequency offset of Δf=1100 [Hz] in FIG. 9, the peak power in the right window (right_window) exceeds the peak power in the center window (center_window).

In case of the frequency offset Δf=−625 [Hz] in FIG. 11, the peak power in the center window (center_window) matches the peak power in the left window (left_window). In case of the frequency offset Δf=−1100 [Hz] in FIG. 12, the peak power in the left window (left_window) exceeds the peak power in the center window (center_window).

Figure 13:
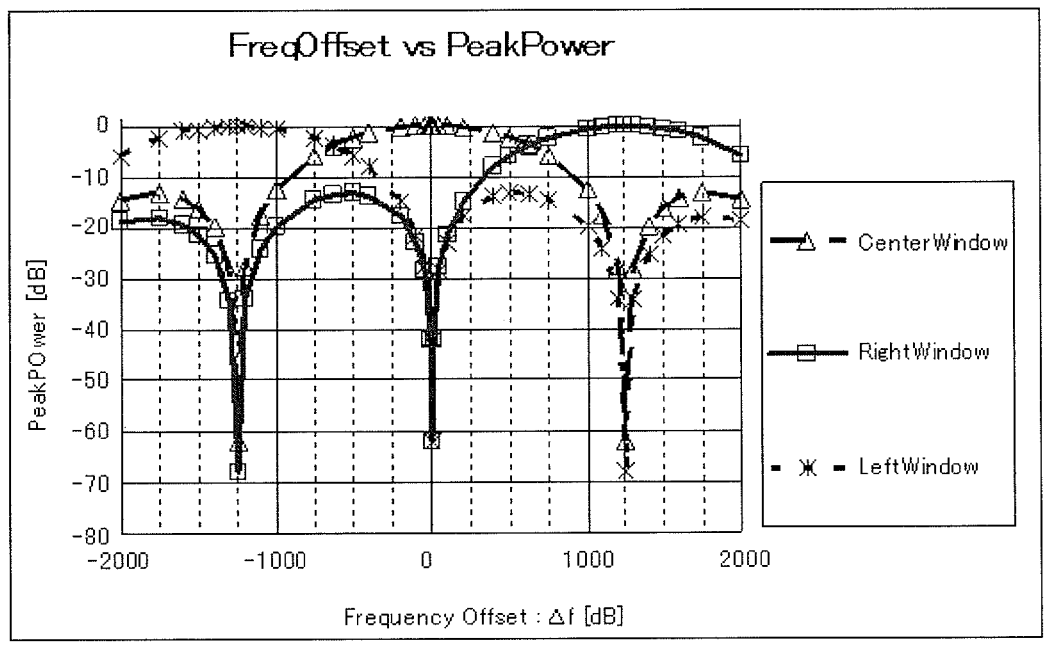
FIG. 13 is a graph illustrating a relationship among peak powers of center, left, and right windows.

FIG. 13 is a graph illustrating a relationship between a frequency offset and peak power in each of the center, right, and left windows. A horizontal axis in FIG. 13 indicates the frequency offset (Frequency Offset: Δf [Hz]), and a vertical axis indicates the peak power [dB]. A triangle symbol indicates the peak power in the center window (center_window), a rectangle symbol indicates the peak power in the right window (right_window), and a symbol x indicates the peak power in the left window (left_window).

It can be seen from FIG. 13 that the following relationships (A1) to (A3) hold according to each frequency offset range. It should be noted that these relationships do not depend on the parameter u (Physical Root Sequence Index).

(A1) In the range of −2000 Hz≤frequency offset≤−625 Hz, the following relationship holds, (the peak power in the center window)<(the peak power in the left window), and (the peak power in the right window)<(the peak power in the left window).

Accordingly, the peak power in the left window is maximum.

(A2) In the range of −625 Hz≤frequency offset≤625 Hz, the following relationship holds, (the peak power in the center window)>(the peak power in the left window), and (the peak power in the right window)<(the peak power in the center window).

Accordingly, the peak power in the center window is maximum.

(A3) In the range of 625 Hz≤frequency offset≤2000 Hz, the following relationship holds, (the peak power in the center window)<(the peak power in the right window), and (the peak power in the left window)<(the peak power in the right window).

Accordingly, the peak power in the right window is maximum.

The phase argR [radian] of the correlation value R between the channel estimation values obtained from the received PUSCH signal is calculated by the following expression (11):

$$2\pi \times \Delta f[Hz] \times T_s[s] \qquad (11)$$

For this reason, with the frequency offset (Frequency Offset: Δf [Hz]) being in the range of from −2000 Hz to 2000 Hz, the following relationships (B1) to (B3) hold with respect to a sign of the phase (argR: −π~π [radian]) of the correlation value R between the PUSCH channel estimation values:

(B1) In the range of −2000 Hz≤the frequency offset≤−1000 Hz, the sign of the phase (argR) of the correlation value R between the PUSCH channel estimation values is +.

(B2) In the range of −1000 Hz≤the frequency offset≤0 Hz, the sign of the phase (argR) of the correlation value R between the PUSCH channel estimation values is −.

(B3) In the range of 0 Hz≤the frequency offset≤1000 Hz, the sign of the phase (argR) of the correlation value R between the PUSCH channel estimation values is +.

(B4) In the range from 1000 Hz≤the frequency offset≤2000 Hz, the sign of the phase (argR) of the correlation value R between the PUSCH channel estimation values is −.

By combining the two properties described in the relationships (A1) to (A3) and the relationships (B1 to B4), which are:

information on the window (center/right/left window) having the maximum peak of the correlation value obtained from the PRACH signal; and the sign of the phase of the correlation value between the channel estimation values obtained from the PUSCH signal, to perform estimation of the frequency offset Δf [Hz], as shown in the following expressions (12) to (15), the estimable range of the frequency offset can be expanded from the range of −1000 Hz to 1000 Hz to the range of −2000 Hz to 2000 Hz in case of the LTE ($T_s$=0.5×10⁻³ [s]).

$$\Delta f[Hz] = \frac{argR[radian]}{2\pi} \times \frac{1}{T_s[s]} (-\pi \le argR < \pi); \qquad (12)$$

if "argR ≥ 0", and "MaxWindow = center or right"

$$\Delta f[Hz] = \left(\frac{argR[radian]}{2\pi} - 1\right) \times \frac{1}{T_s[s]} (-\pi \le argR < \pi); \qquad (13)$$

if "argR ≥ 0", and "MaxWindow = left"

$$\Delta f[Hz] = \frac{argR[radian]}{2\pi} \times \frac{1}{T_s[s]} (-\pi \le argR < \pi); \qquad (14)$$

if "argR < 0", and "MaxWindow = center or left"

$$\Delta f[Hz] = \left(\frac{argR[radian]}{2\pi} + 1\right) \times \frac{1}{T_s[s]} (-\pi \le argR < \pi); \qquad (15)$$

if "argR < 0", and "MaxWindow = right"

In the expressions (12) to (15), Δf [Hz] is a frequency offset estimation value.

MaxWindow=right means that peak power in the right window is maximum (maximum window=right window).

MaxWindow=center means that peak power in the center window is maximum (maximum window=center window).

MaxWindow=left means that peak power in the left window is maximum (maximum window=left window).

In case the frequency offset is +1100 Hz, for example, the phase argR of the correlation value R between the reference symbols becomes equal to −0.9 π [radian], as shown in the above expression (8). In this case, the maximum window becomes the right window based on the relationship (A3), and based on the expression (15), the frequency offset estimation value Δf [Hz] is obtained:

$$\Delta f = \left(\frac{-0.9\pi[radian]}{2\pi} + 1\right) \times \frac{1}{T_s[s]} = \left(\frac{1.1\pi}{2\pi}\right) \times \frac{1}{0.5 \times 10^{-3}} = 1100[Hz] \qquad (16)$$

More generally, the frequency offset estimable range can be expanded from expression (17) (which is the same as the expression (7)) to expression (18).

$$-\frac{1}{2} \cdot \frac{1}{T_s}[Hz] \sim \frac{1}{2} \cdot \frac{1}{T_s}[Hz] \qquad (17)$$

$$-\frac{1}{T_s}[Hz] \sim \frac{1}{T_s}[Hz] \qquad (18)$$

In the estimable frequency offset range of −1/TS≤Δf<1/TS in the above expression (18), a lower limit −1/TS corresponds to the frequency offset estimation value Δf when the arg R [radian]=−π in the above expression (13), and 1/TS corresponds to the frequency offset estimation value Δf when the phase argR [radian] is set to π in the above expression (15). The following describes exemplary embodiments.

Exemplary Embodiments

Figure 14:
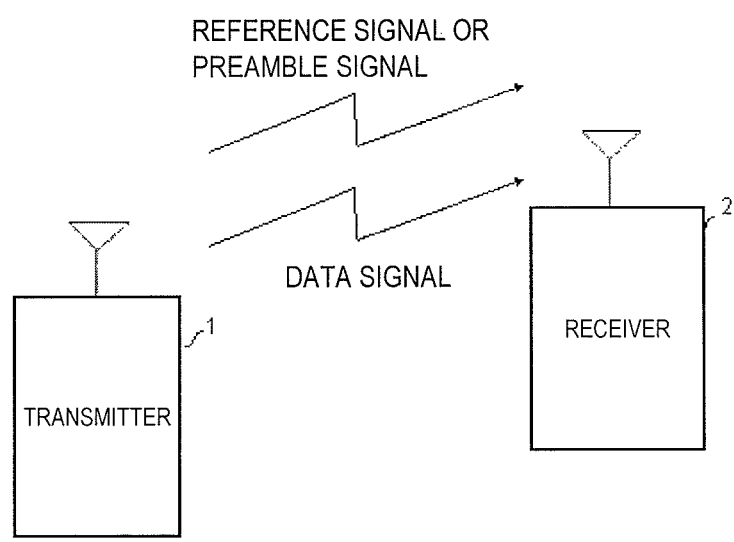
FIG. 14 is a diagram illustrating a configuration of a single carrier transmission system in an exemplary embodiment of the present invention.

FIG. 14 is a block diagram illustrating a configuration of a single carrier transmission system according to an exemplary embodiment of the present invention. The single carrier transmission system in this exemplary embodiment is constituted from a transmitter 1 and a receiver 2.

Figure 15:
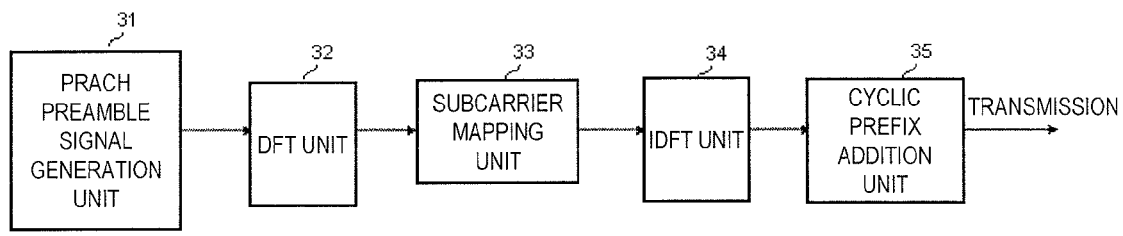
FIG. 15 is a diagram illustrating a configuration of a (PRACH) transmitter in the single carrier transmission system in the exemplary embodiment of the present invention.
Figure 16:
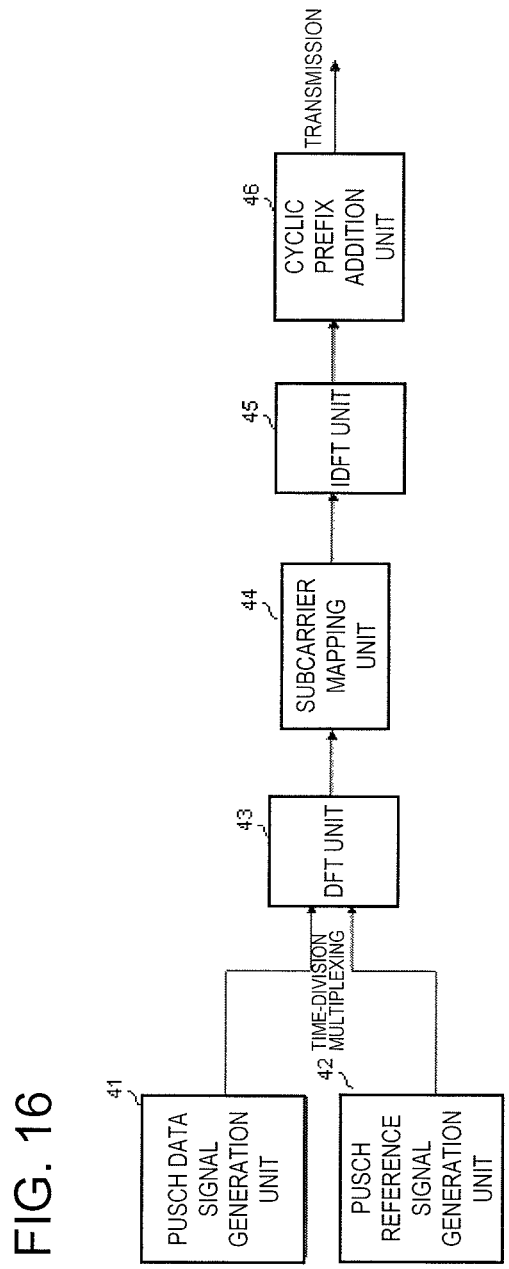
FIG. 16 is a diagram illustrating a configuration of a (PUSCH) transmitter in the single carrier transmission system in the exemplary embodiment of the present invention.

FIG. 15 is a diagram illustrating a configuration of a PRACH transmission processing unit of the transmitter in the single carrier transmission system in FIG. 14. FIG. 16 is a diagram illustrating a configuration of a PUSCH transmission processing unit of the transmitter in the single carrier transmission system in FIG. 14.

Referring to FIG. 15, the PRACH transmission processing unit includes a PRACH preamble signal generation unit 31, a DFT (Discrete Fourier Transform) unit 32, a subcarrier mapping unit 33, an IDFT (Inverse Discrete Fourier Transform) unit 34, and cyclic prefix addition unit 35.

Referring to FIG. 16, the PUSCH transmission processing unit includes a PUSCH data signal generation unit 41, a PUSCH reference signal generation unit 42, a DFT unit 43, a subcarrier mapping unit 44, an IDFT unit 45, and a cyclic prefix addition unit 46. The block configuration shown in each of FIGS. 14 and 15 shows an example of a configuration of a common transmitter in the single carrier transmission system. The transmission processing units are not always limited to such configurations. Operation at a time of a PUSCH transmission is as follows.

Figure 3:
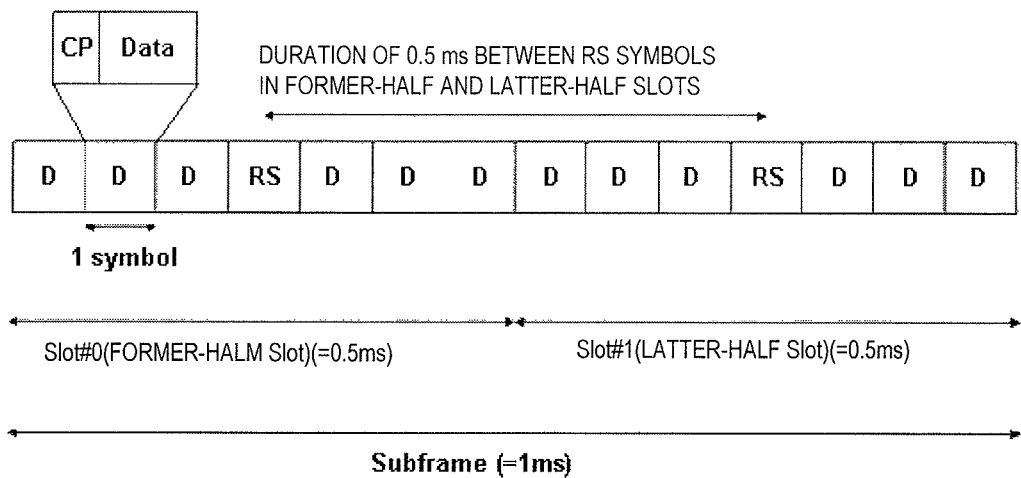
FIG. 3 is a diagram illustrating a PUSCH subframe format.

The PUSCH data signal generation unit 41 and the PUSCH reference signal generation unit 42 generates transmission data signals and transmission reference symbols respectively. Those signals are time-division multiplexed according to a subframe format shown in FIG. 3, and the DFT unit 43 performs DFT on the time-division multiplexed signal. The subcarrier mapping unit 44 performs mapping of each frequency component after the DFT onto a subcarrier allocated to each use. The IDFT unit 45 performs IDFT on the signal after the mapping by the subcarrier mapping unit 44. Finally, the cyclic prefix addition unit 46 adds cyclic prefixes to a signal after the IDFT by, for transmission.

In case of a PRACH, the preamble signal generation unit 31 generates a preamble signal and the DFT unit 32 performs DFT on the generated signal. Subsequent processing is the same as in case of the PUSCH transmission.

Figure 17:
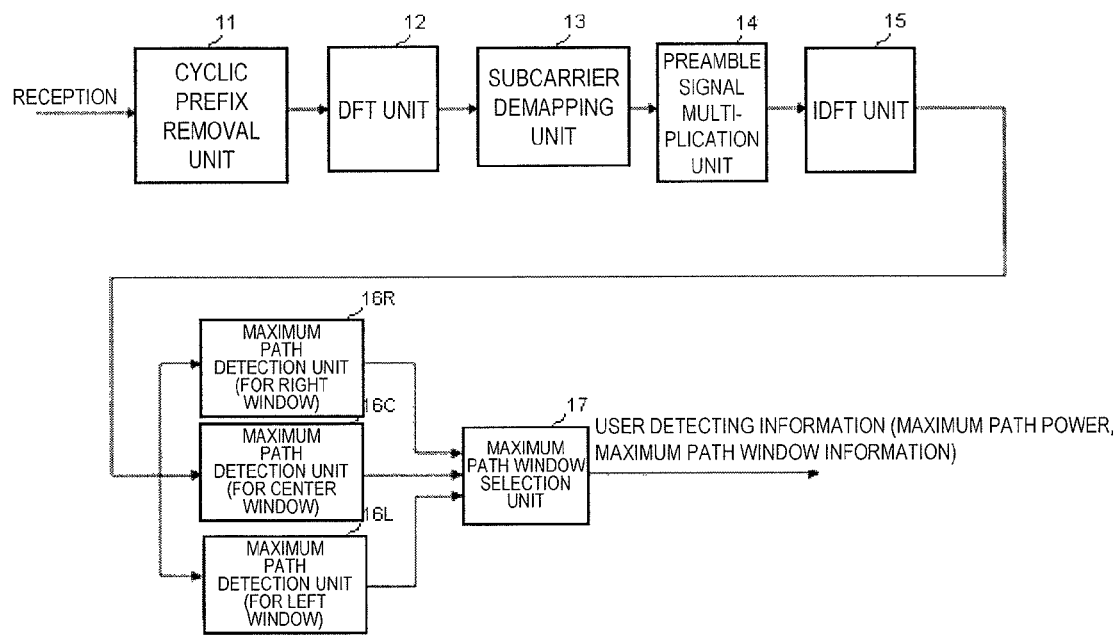
FIG. 17 is a diagram illustrating a configuration of a (PRACH) receiver in the single carrier transmission system in the exemplary embodiment of the present invention.
Figure 18:
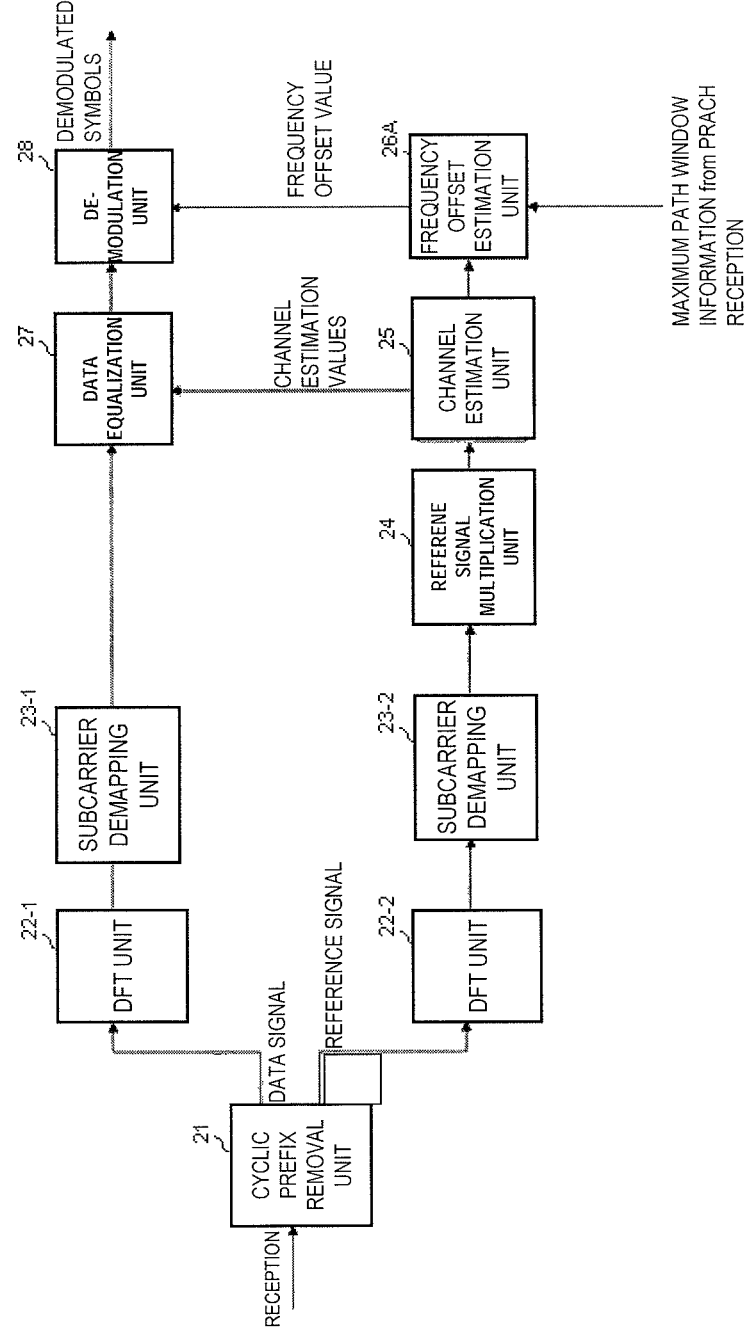
FIG. 18 is a diagram illustrating a configuration of a (PUSCH) receiver in the single carrier transmission system in the exemplary embodiment of the present invention.

Next, a configuration of a receiver in the single carrier transmission system in the exemplary embodiment of the present invention will be described. FIG. 17 is a diagram illustrating a configuration of a receiver (PRACH reception processing unit) in the single carrier transmission system in FIG. 15. FIG. 18 is a diagram illustrating a configuration of a receiver (PUSCH reception processing unit) in the single carrier transmission system in FIG. 15.

Figure 4:
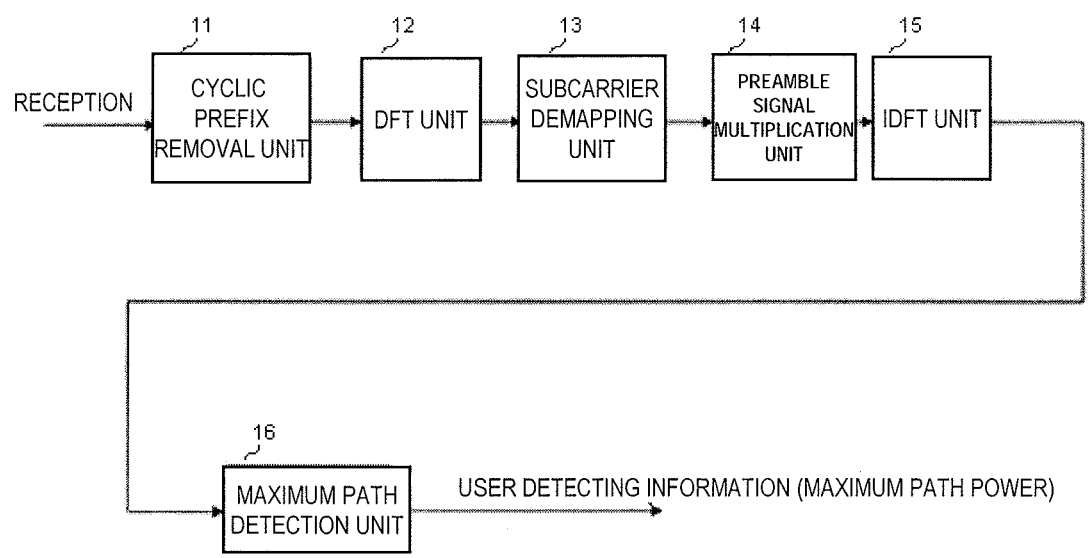
FIG. 4 is a diagram illustrating a configuration of a PRACH receiver.

Referring to FIG. 17, the receiver (PRACH reception processing unit) for a PRACH reception includes a cyclic prefix removal unit 11, a DFT unit 12, a subcarrier demapping unit 13, a preamble signal multiplication unit 14, an IDFT unit 15, maximum path detection units 16R, 16C, and 16L, and a maximum path window selection unit 17. In this exemplary embodiment, the maximum path window selection unit 17 is added to the configuration in FIG. 4.

Referring to FIG. 18, the receiver (PUSCH reception processing unit) for a PUSCH reception includes a cyclic prefix removal unit 21, DFT units 22-1 and 22-2, subcarrier demapping units 23-1 and 23-2, a reference signal multiplication unit 24, a channel estimation unit 25, a frequency offset estimation unit 26A, a data equalization unit 27, and a demodulation unit 28.

Figure 5:
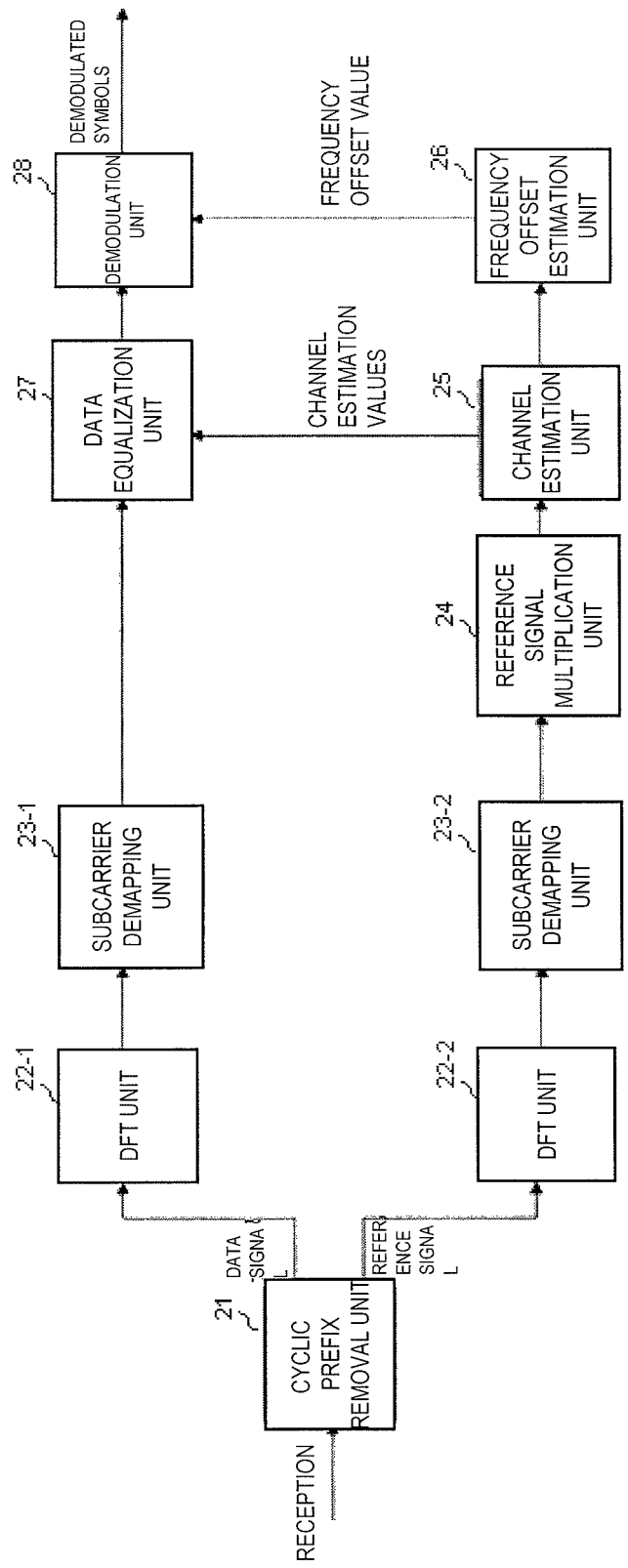
FIG. 5 is a diagram illustrating a configuration of a PUSCH receiver.

This exemplary embodiment is different from the configuration in FIG. 5 in that maximum path window selection information from the PRACH reception is added to data input to the frequency offset estimation unit 26A. FIGS. 17 and 18 illustrate examples of the exemplary embodiment of the present invention. The present invention is not of course limited to such configurations.

In case of the PRACH reception, the cyclic prefix removal unit 11 removes cyclic prefixes from a received PRACH signal. Then, the DFT unit 12 performs DFT on a signal having the cyclic prefixes removed. The subcarrier demapping unit 13 performs subcarrier demapping on a signal after the DFT to extract a signal corresponding to a frequency resource specified for random access.

The preamble signal multiplication unit 14 multiplies a signal after the subcarrier demapping with a complex conjugate of a transmission preamble signal.

The IDFT unit 15 performs IDFT on data after the multiplication. Then, the maximum path detection units 16R, 16C, and 16L detect maximum paths for three (center, right, and left) windows respectively. The maximum path window selection unit 17 in the subsequent stage selects one of the windows having the maximum power from among maximum path powers of the three windows (details of which will be described later).

In case of the PUSCH reception, the cyclic prefix removal unit 21 removes cyclic prefixes from a received PUSCH signal to divide the resulting signal into a data signal and reference symbols.

Next, the DFT units 22-1 and 22-2 perform DFTs on the received data signal and the received reference symbols, respectively. The subcarrier demapping units 23-1 and 23-2 perform subcarrier demapping on the signal after the DFT respectively to extract a signal in a frequency domain allocated to the user.

The reference signal multiplication unit 24 multiplies a reference symbol subcarrier demapped with a complex conjugate of a transmission reference symbol. Then, the channel estimation unit 25 obtains a channel estimation value.

The frequency offset estimation unit 26A estimates a frequency offset amount, using the channel estimation value obtained, and the maximum path window information obtained from the received PRACH signal (details of which will be described later).

Next, the obtained channel estimation values and a data signal after the subcarrier demapping are supplied to the data equalizer 27. which performs a frequency domain equalization on the data signal.

Finally, the demodulation unit 28 converts the signal equalized in frequency domain into a time domain signal. Further, the demodulation unit 28 performs frequency offset compensation, using the estimated frequency offset amount.

The following describes details of the maximum path detection units 16R, 16C and 16L and the maximum path window selection unit for the PRACH in the exemplary embodiment of the present invention.

DFT output data p(n) (n=0, 1, 2, ..., $N_{zc-1}$) are supplied to three maximum path detection units 16R, 16C, and 16L (for the center window, the right window, and the left window) in the PRACH reception processing unit.

Power P(k) (k=0, 1, ..., $N_{zc-1}$) for each sample is calculated from the input data p(k) (k=0, 1, ..., $N_{zc-1}$), using the following expression (19):

$$P(k)=|p(k)|^2; k=0, 1, \ldots, N_{ZC}-1 \tag{19}$$

Next, each of the maximum path detection units 16R, 16C, and 16L for the center window, the right window, and the left window searches the maximum path, as shown in the following expressions (20), (21), and (22) to obtain power of the maximum path for each window. The center, right, and left windows are ranges respectively defined as $W_{center}$, $W_{right}$, and $W_{left}$ in expressions (20), (21), and (22).

(Center Window)

$$P_{max,center} = \max_{k \in W_{center}} |p(k)|^2; W_{center} = \{0, 1, \ldots, N_{search}-1\} \tag{20}$$

(Right Window)

$$P_{max,right} = \max_{k \in W_{right}} |p(k)|^2; \tag{21}$$

$$W_{right} = \{d^{-1}, (d^{-1}+1) \bmod N_{ZC}, \ldots, (d^{-1}+N_{search}-1) \bmod N_{ZC}\}$$

(Left Window)

$$P_{max,left} = \max_{k \in W_{left}} |p(k)|^2; \quad (22)$$

$$W_{left} = \{N_{ZC} - d^{-1}, (N_{ZC} - d^{-1} + 1) \bmod N_{ZC}, \ldots, (N_{ZC} - d^{-1} + N_{search} - 1) \bmod N_{ZC}\}$$

In the above expressions (20), (21), and (22), $N_{search}$ is a path search width, and is generally given by the following expression (23). It is noted that the path search width is not always limited to that given by the following expression (23).

$$N_{search}[\text{sample}] = \left\lceil N_{ZC} \times \frac{2R_{cell}/(3.0 \times 10^8)}{0.8 \times 10^{-3}} \right\rceil \quad (23)$$

where $\lceil \ \rceil$ is an integer round-up operation (operation).

$R_{cell}$ is a radius of a cell [m].

$3.0 \times 10^8$ [m/s] is a speed of light.

$0.8 \times 10^{-3}$ [s] is a duration of a PRACH preamble.

NZC is the number of preamble samples (=839 [samples]).

In case of $R_{cell}$=25 [km](=25000 [m]), for example, the path search width $N_{search}$ is found to be 175 [samples], as shown in the following expression (24).

$$N_{search}[\text{sample}] = \left\lceil 839 \times \frac{2 \times 25000/(3.0 \times 10^8)}{0.8 \times 10^{-3}} \right\rceil = 175 \quad (24)$$

Maximum path power output values $P_{max, center}$, $P_{max, right}$, $P_{max, left}$ from the center, right, and left windows obtained by the above-mentioned method are supplied to the maximum path window selection unit 17 to select a maximum path window MaxWindow (=center, right, or left) according to the following criterion.

The selection criterion for the maximum path window is given by the following expression (25), for example. Information on the selected maximum path is supplied to the frequency offset estimation unit 26A for the PUSCH.

$$\text{MaxWindow} = \arg \max_{W \in \{center, right, left\}} P'_{max, W}, \quad (25)$$

$$P'_{max, center} = S \times P_{max, center}, P'_{max, right} = P_{max, right}, P'_{max, left} = P_{max, left},$$

where S is a scaling value.

Next, the channel estimation unit 25 obtains, for each subcarrier allocated to the user, a complex channel estimation value:

$$H(s, k) \quad (26)$$

from the received PUSCH signal.

where (slot number in one subframe)=0, 1.

k (subcarrier number)=0, 1, . . . , N−1; N is the number of subcarriers allocated to the user). The information on the maximum path window obtained from the received PRACH signal of the user by the above-mentioned method is supplied to the frequency offset estimation unit 26A of the PUSCH receiver, together with data on complex channel estimation values.

The frequency offset estimation unit 26A calculates the complex correlation value R indicated by the above expression (3). The calculated correlation value R and the information on the maximum path window (=center, right, or left) obtained from the received PRACH signal are combined to estimate a frequency offset based on the criterion indicated by one of the following expressions (27) to (30).

$$\Delta f[\text{Hz}] = \frac{\arg R[\text{radian}]}{2\pi} \times \frac{1}{T_S[s]} (-\pi \leq \arg R < \pi); \quad (27)$$

if "$\arg R \geq 0$", and "MaxWindow = center or right"

$$\Delta f[\text{Hz}] = \left( \frac{\arg R[\text{radian}]}{2\pi} - 1 \right) \times \frac{1}{T_S[s]} (-\pi \leq \arg R < \pi); \quad (28)$$

if "$\arg R \geq 0$", and "MaxWindow = left"

$$\Delta f[\text{Hz}] = \frac{\arg R[\text{radian}]}{2\pi} \times \frac{1}{T_S[s]} (-\pi \leq \arg R < \pi); \quad (29)$$

if "$\arg R < 0$", and "MaxWindow = center or left"

$$\Delta f[\text{Hz}] = \left( \frac{\arg R[\text{radian}]}{2\pi} + 1 \right) \times \frac{1}{T_S[s]} (-\pi \leq \arg R < \pi); \quad (30)$$

if "$\arg R < 0$", and "MaxWindow = right"

The frequency offset estimation value Δf[Hz] calculated by the above-mentioned technique is supplied to the demodulation unit 28 of the PUSCH receiver and the demodulation unit 28 perform frequency offset compensation. That is, the demodulation unit 28, performs the frequency offset compensation on the signal converted to the time domain signal, using the frequency offset amount estimated by the frequency offset estimation unit 26A, as in the related art. The frequency offset compensation performed on the signal converted into the time domain signal is given by the above-mentioned expression (1), for example.

Next, necessity, operation, and effect of S (scaling value) ($P'_{max, center} = S \times P_{max, center}$) in expression (25) giving the selection criterion for the maximum path window will be described.

In the above description, for simplicity, discussion was made, without taking into consideration an influence of an interference (noise) component. In actual reception processing, some interference component is certainly added to a received signal, so that it is necessary to take the influence of the interference component into consideration. Then, error events E0, E1, E2, and E3 listed below will be considered in order to examine the influence of the interference (noise) component on the present invention. Each of the events (E0 to E3) listed below indicates an event in which an estimated frequency offset greatly deviates due to a selection error of maximum window information calculated from a received PRACH signal caused by an interference component included in a complex correlation value.

E0: event in which MaxWindow≠Right under a condition: Δf≥1000 [Hz]

E1: event in which MaxWindow=Left under a condition: 0[Hz]≤Δf≤1000 [Hz]

E2: event in which MaxWindow=Right under a condition: −1000 [Hz]≤Δf≤0 [Hz]

E3: event in which MaxWindow≠Left under a condition: Δf≤−1000 [Hz]

Assuming that probabilities at which the events E0, E1, E2, and E3 will occur are respectively defined to be Pr0, Pr1, Pr2, and Pr3, Pr3=Pr0 and Pr2=pr1 hold due to symmetry. Thus, attention will be hereinafter focused on Pr0 and Pr1 alone.

Figure 19:
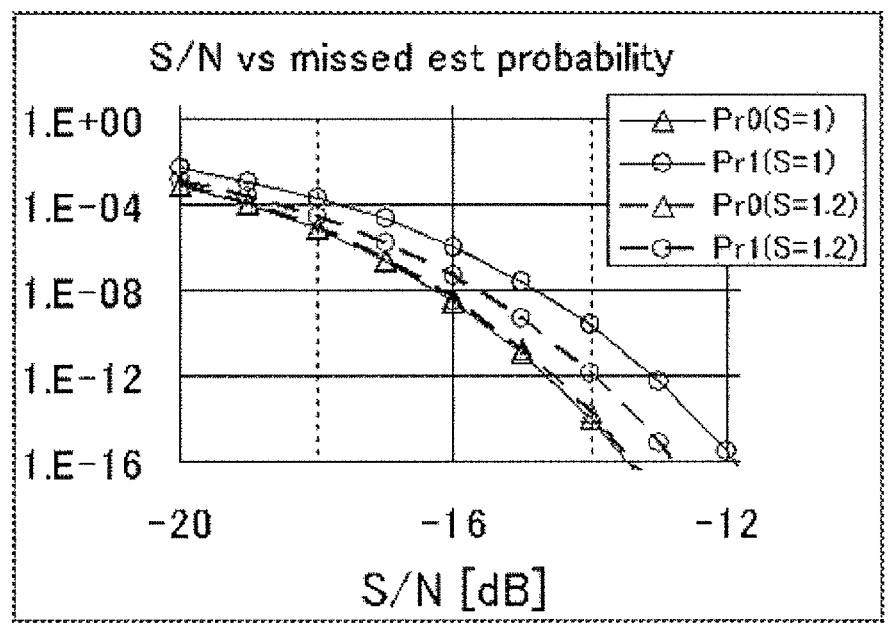
FIG. 19 is a graph illustrating error detection probabilities.

FIG. 19 shows the error probabilities Pr0 and Pr1 with respect to a reception S/N [dB] (decibel representation of a signal to noise power ratio). Referring to FIG. 19, triangles connected by a solid line (thin line) indicates Pr0 (S=1), circles connected by a solid line (thin line) indicates Pr1 (S=1), triangles connected by a broken line (thick line) indicates Pr0 (S=1.2), and circles connected by a broken line (thick line) indicates Pr1 (S=1.2).

As shown in FIG. 19, in case there is no scaling S (equivalent to S=1), frequencies of occurrence of the two different error events E0 and E1 (Pr0 (S=1) and Pr1 (S=1) indicated by the solid lines) greatly differ, so that one of the error events (=E1) becomes dominant. That is, in this case, the probability at which the maximum window (MaxWindow) for the frequency offset in the range of −1000 Hz to 1000 Hz is erroneously selected becomes greater than the probability at which the maximum window (MaxWindow) for the frequency offset in the range of 1000 Hz or more or in the range of −1000 Hz or less is erroneously selected.

On contrast therewith, in case S is set to be 1.2, frequencies of occurrence of the two events become close as shown in FIG. 19 (by the broken lines Pr0 (S=1.2) and Pr1 (S=1.2)), so that the two error events are balanced within the ranges of all the frequency offsets to be compensated for. In other words, the probabilities of occurrence of selection errors of the maximum windows (MaxWindows) for any users can be made uniform, irrespective of the magnitude of a frequency offset amount for each user.

Processing of each of the maximum path detection units 16C, 16L, and 16R, that detects the maximum path based on a signal (digital signal) from the IDFT unit 15, processing of the maximum path window selection unit 17 that selects the maximum path window in the PRACH reception processing unit in FIG. 17 and frequency offset estimation processing of the frequency offset estimation unit 26A in the PUSCH reception processing unit in FIG. 18 may be of course implemented by a program (software processing) to be executed on a computer. According to the present invention, there is provided a storage medium (a memory device, a magnetic/optical disk medium/device) having the program stored therein.

As described above, according to this exemplary embodiment, operation and effect as will be described below are achieved.

By combining maximum window information obtained from a received PRACH signal, in addition to a correlation value between channel estimation values obtained from a received PUSCH signal, in order to estimate a frequency offset, it is made possible to expand an estimable frequency offset range from $$-\frac{1}{2} \cdot \frac{1}{T_S}[Hz] \sim \frac{1}{2} \cdot \frac{1}{T_S}[Hz]$$

to $$-\frac{1}{T_S}[Hz] \sim \frac{1}{T_S}[Hz]$$

where $T_s$ is a duration between two PUSCH reference symbols in one sub frame.

Further, by introducing the scaling value (S) as the selection criterion in the maximum window selection unit, it is made possible to make the probabilities of occurrence of selection errors of the maximum windows (MaxWindows) for all users uniform, irrespective of the magnitude of a frequency offset amount for each user.

Modifications and adjustments of the exemplary embodiments and an example are possible within the scope of the overall disclosure (including claims) of the present invention, and based on the basic technical concept of the invention. Various combinations or selections of various disclosed elements are possible within the scope of the overall disclosure of the present invention. That is, the present invention of course includes various variations and modifications that could be made by those skilled in the art according to the overall disclosure including the claims and the technical concept.

The invention claimed is:

1. A frequency offset estimation method, comprising:
performing channel estimation from a received PUSCH (Physical Uplink Shared Channel) signal;
estimating a frequency offset by combining:
information on a maximum window having a maximum peak power, obtained from a received PRACH (Physical Random Access Channel) signal, and
a sign of a phase of a correlation value between channel estimation values obtained from the received PUSCH signal; and
estimating the frequency offset from the phase of the correlation value between the channel estimation values, based on:
a correspondence relationship between each frequency segment of a first frequency segment group obtained by dividing an estimable frequency offset range and the maximum window; and
a relationship between each frequency segment of a second frequency segment group obtained by dividing the estimable frequency offset range and the sign of the correlation value between the channel estimation values.

2. The frequency offset estimation method according to claim 1, further comprising:
detecting respective maximum path powers of a plurality of mutually different windows from the received PRACH signal, using the plurality of mutually different windows;
selecting one of the windows corresponding to the maximum power from among the detected maximum path powers; and
estimating the frequency offset, using information on the phase of the correlation value between the channel estimation values and the sign of the phase and the information on the maximum window.

3. A frequency offset estimation method, comprising:
performing channel estimation from a received PUSCH (Physical Uplink Shared Channel) signal;
estimating a frequency offset by combining:
information on a maximum window having a maximum peak power, obtained from a received PRACH (Physical Random Access Channel) signal, and
a sign of a phase of a correlation value between channel estimation values obtained from the received PUSCH signal;
detecting respective maximum path powers of a plurality of mutually different windows from the received PRACH signal, using the plurality of mutually different windows;
selecting one of the windows corresponding to the maximum power from among the detected maximum path powers; and estimating the frequency offset, using information on the phase of the correlation value between the channel estimation values and the sign of the phase and the information on the maximum window, wherein the windows includes a center window, a left window, and a right window, the method comprising:

with argR [radian] being an argument of a complex correlation value R, wherein R is a complex number, between the channel estimation values obtained from the received PUSCH signal being indicated and a duration between reference symbols in a former-half slot, and $T_s[s]$ being a latter-half slot of a PUSCH subframe, determining a frequency offset $\Delta f$ according to the following expression, in case the argR is greater than or equal to 0 and less than $\pi$, and the maximum window is the center window or the right window:

$$\Delta f = \frac{\arg R[\text{radian}]}{2\pi} \times \frac{1}{T_S[s]}$$

in case the argR is greater than or equal to 0 and less than $\pi$, and the maximum window is the left window:

$$\Delta f = \left(\frac{\arg R[\text{radian}]}{2\pi} - 1\right) \times \frac{1}{T_S[s]}$$

in case the argR is greater than or equal to $-\pi$ and less than 0, and the maximum window is the center window or the left window:

$$\Delta f = \frac{\arg R[\text{radian}]}{2\pi} \times \frac{1}{T_S[s]}$$

and, in case the argR is greater than or equal to $-\pi$ and less than 0, and the maximum window is the right window:

$$\Delta f = \left(\frac{\arg R[\text{radian}]}{2\pi} + 1\right) \times \frac{1}{T_S[s]}$$

the estimable frequency offset range being set to a range greater than or equal to $-1/T_s$ [Hz] and less than $+1/T_s$ [Hz].

4. The frequency offset estimation method according to claim 3, wherein with a path search width being indicated by $N_{search}$, a preamble sequence length being indicated by $N_{zc}$, and a distance between peaks of the center window and each of the left and right windows being indicated by d, wherein d is an integer, first to third maximum path detectors respectively corresponding to the center window, the left window, and the right window, respectively determining maximums values of squares of powers p (k), using a center window $W_{center}=\{0, 1, \ldots, N_{search}-1\}$, a right window $W_{right}=\{d^{-1}(d^{-1}+1) \bmod N_{ZC}, \ldots, (d^{-1}+N_{search}-1) \bmod N_{ZC}\}$, and a left window $W_{left}=\{N_{ZC}-d^{-1}, (N_{ZC}-d^{-1}+1) \bmod N_{ZC}, \ldots, (N_{ZC}-d^{-1}+N_{search}-1) \bmod N_{ZC}\}$, respectively.

5. The frequency offset estimation method according to claim claim 3, further comprising selecting the maximum window from among the maximum path powers of the windows, based on the power adjusted by a predetermined scaling value.

6. A frequency offset compensation method comprising:

performing frequency offset compensation, using a frequency offset estimated by the frequency offset estimation method as set forth in claim 1.

7. A non-transitory computer-readable storage medium having a frequency offset estimation program stored therein for causing a computer to execute the processing comprising:

performing channel estimation from a received PUSCH (Physical Uplink Shared Channel) signal; and estimating a frequency offset by combining:

information on a maximum window having a maximum peak power, obtained from a received PRACH (Physical Random Access Channel) signal; and a sign of a phase of a correlation value between channel estimation values obtained from a received PUSCH signal, wherein the frequency offset estimation processing estimates the frequency offset from the phase of the correlation value between the channel estimation values, based on:

a correspondence relationship between each frequency segment of a first frequency segment group obtained by dividing an estimable frequency offset range and the maximum window; and a relationship between each frequency segment of a second frequency segment group obtained by dividing the estimable frequency offset range and the sign of the correlation value between the channel estimation values.

8. The storage medium according to claim 7, wherein the program stored therein causes the computer to execute the processing further comprises:

detecting respective maximum path powers of a plurality of mutually different windows from the received PRACH signal, using the plurality of mutually different windows;

selecting a window corresponding to the maximum power from among the detected maximum path powers; and estimating the frequency offset, using information on the phase of the correlation value between the channel estimation values and the sign of the phase and the information on the maximum window from the maximum path window selection unit.

9. A non-transitory computer-readable storage medium having a frequency offset estimation program stored therein for causing a computer to execute the processing comprising:

performing channel estimation from a received PUSCH (Physical Uplink Shared Channel) signal;

estimating a frequency offset by combining:

information on a maximum window having a maximum peak power, obtained from a received PRACH (Physical Random Access Channel) signal; and a sign of a phase of a correlation value between channel estimation values obtained from a received PUSCH signal, detecting respective maximum path powers of a plurality of mutually different windows from the received PRACH signal, using the plurality of mutually different windows;

selecting a window corresponding to the maximum power from among the detected maximum path powers; and estimating the frequency offset, using information on the phase of the correlation value between the channel estimation values and the sign of the phase and the information on the maximum window from the maximum path window selection unit, wherein the windows includes a center window, a left window, and a right window, the program stored in the storage medium causing the computer to execute the processing further comprising:

with argR [radian] being an argument of a complex correlation value R, wherein R is a complex number, between the channel estimation values obtained from the received PUSCH signal, and $T_s[s]$ being a duration between reference symbols in a former-half slot and a latter-half slot of a PUSCH subframe, determining a frequency offset $\Delta f$ according to the following expression, in case the argR is greater than or equal to 0 and less than $\pi$, and the maximum window is the center window or the right window:

$$\Delta f = \frac{\arg R[\text{radian}]}{2\pi} \times \frac{1}{T_S[s]}$$

in case the argR is greater than or equal to 0 and less than $\pi$, and the maximum window is the left window:

$$\Delta f = \left(\frac{\arg R[\text{radian}]}{2\pi} - 1\right) \times \frac{1}{T_S[s]}$$

in case the argR is greater than or equal to $-\pi$ and less than 0, and the maximum window is the center window or the left window:

$$\Delta f = \frac{\arg R[\text{radian}]}{2\pi} \times \frac{1}{T_S[s]}$$

and, in case the argR is greater than or equal to $-\pi$ and less than 0, and the maximum window is the right window:

$$\Delta f = \left(\frac{\arg R[\text{radian}]}{2\pi} + 1\right) \times \frac{1}{T_S[s]}$$

the estimable frequency offset range being set to a range greater than or equal to $-1/T_s$ [Hz] and less than $+1/T_s$ [Hz].

10. The storage medium according to claim 8, wherein the program stored therein causes the computer to execute the processing further comprises:

selecting the maximum window from among the maximum path powers of the windows, based on the power adjusted by a predetermined scaling value.

* * * * *

UNITED STATES PATENT AND TRADEMARK OFFICE
CERTIFICATE OF CORRECTION

Page 1 of 1

PATENT NO. : 8,797,994 B2
APPLICATION NO. : 13/509710
DATED : August 5, 2014
INVENTOR(S) : Oketani It is certified that error appears in the above-identified patent and that said Letters Patent is hereby corrected as shown below:

In the Specification

Column 5, Line 3: Delete "Ts" and insert -- $T_s$ --
Column 6, Line 5: Delete "$0.97\pi$" and insert -- $-0.9\pi$ --
Column 14, Line 34: Delete "for" and insert -- 17 for --
Column 14, Line 36: Delete "$N_{zc-1}$)" and insert -- $N_{zc}$-1) --
Column 14, Line 40: Delete "$N_{zc-1}$)" and insert -- $N_{zc}$-1) --
Column 14, Line 41: Delete "$N_{zc-1}$)" and insert -- $N_{zc}$-1) --
Column 15, Line 26: Delete "NZC" and insert -- $N_{ZC}$ --
Column 15, Line 60: Delete "(slot" and insert -- s (slot --

In the Claims

Column 19, Line 64: Claim 4, delete "$\{d^{-1}(d^{-1}$" and insert -- $\{d^{-1}, (d^{-1}$ --

Signed and Sealed this
Tenth Day of February, 2015

Michelle K. Lee
*Deputy Director of the United States Patent and Trademark Office*